United States Patent [19]

Gibson et al.

[11] 3,761,635

[45] Sept. 25, 1973

[54] TRUNK CIRCUIT IDENTIFICATION

[75] Inventors: John C. Gibson, Oak Lawn; Siegfried H. Fuchs, Chicago; Robert S. Vaniman, Palatine, all of Ill.

[73] Assignee: GTE Automatic Electric Laboratories Incorporated, Northlake, Ill.

[22] Filed: May 15, 1972

[21] Appl. No.: 253,216

[52] U.S. Cl. .................... 179/18 FH, 179/175.2 C

[51] Int. Cl. .................... H04m 3/22

[58] Field of Search .................... 179/18 FH, 27 DB, 179/175.2 C

[56] References Cited

UNITED STATES PATENTS 3,541,269 11/1970 Fritschi .................... 179/18 FH

FOREIGN PATENTS OR APPLICATIONS 1,079,038 8/1967 Great Britain .................... 179/18 FH 952,496 3/1964 Great Britain .................... 179/18 FH

*Primary Examiner*—Thomas W. Brown

*Attorney*—K. Mullerheim et al.

[57] ABSTRACT

A technique for tracing calls involving two trunk circuits located in the same telephone switching center. Means are provided whereby an unknown outgoing trunk connected to a known incoming trunk may be identified, or an unknown incoming trunk connected to a known outgoing trunk may be identified.

5 Claims, 3 Drawing Figures

INCOMING TRUNK 200

OUTGOING TRUNK 300

TRUNK CIRCUIT IDENTIFICATION

BACKGROUND OF THE INVENTION

1. Field of the Invention

This invention relates to telephony, and more particularly to the identification of trunk circuits located in a telephone switching center that may be associated with improperly operating circuits or may be involved in the transmission of nuisance calls. In general the technique of call tracing throughout telephone switching centers is well-known. By means of this technique faulty trunks or other equipment may be identified and the necessary maintenance work performed. In the well-known Strowger or step-by-step type of system, call tracing by identification of the involved switches is a relatively simple matter. However in common control offices the identification of connected trunks involves more difficult procedures.

2. Description of the Prior Art

In call tracing within common control switching centers one technique that has been employed utilizes the use of a retard coil and relay connected in a simplex arrangement with a lamp located at an associated test board appropriately designated.

Other means employed have consisted of the actual physical tracing of the employed circuits as in step-by-step offices with resultant time consumption and difficulty. Another is the use of a tone generator applied to the circuits in question, and the use of a tone detector applied at various points in the various circuits to locate the circuits to be identified. Obviously all of the techniques described above either require the addition of extra equipment in the trunk circuits or involvement in procedures that are extremely time consuming. Accordingly it is the purpose of the present invention to provide a call tracing technique for use in telephone switching centers operated on a common control basis, that will readily identify unknown trunk circuits, without the addition of costly equipment or the use of detection techniques that are extremely time consuming.

SUMMARY OF THE INVENTION

In the technique presented herein the differential pulsing relays normally provided for pulsing forward or repeating "off-hook/on-hook" supervision are employed for call tracing. Each trunk in the tandem office is equipped with connections to a call tracing jack located at a test board which is equipped with a pulse generator. By means of a cord circuit the pulse generator is plugged into the call tracing jack of a known trunk circuit to which the unknown trunk circuit to be identified is connected.

The pulses applied from the signal generator are transmitted then from one trunk to the other ("known to unknown") via the EC lead which will cause the differential pulsing relay in the unknown trunk to follow the pulses transmitted from the pulse generator. A contact of the differential relay is placed in series with a lamp lead extending to a lamp located at the test board. This will cause the lamp to flash at the rate of the pulses. This rate is selected to be faster than normal flashing from "off-hook" or "on-hook" supervision or dial pulsing and continues until such time as the plug is removed. This provides a ready and easily recognizable indicator to the test board operator, of the identity of the unknown trunk circuit.

As indicated previously call tracing may be used in the forward direction, i.e., a known incoming trunk to an unknown outgoing trunk for maintenance purposes. Or call tracing back-ward, i.e., a known outgoing trunk connected to an incoming unknown trunk for the identification of trunk circuits involved in nuisance calls.

DESCRIPTION OF THE PREFERRED EMBODIMENT

Figure 1:
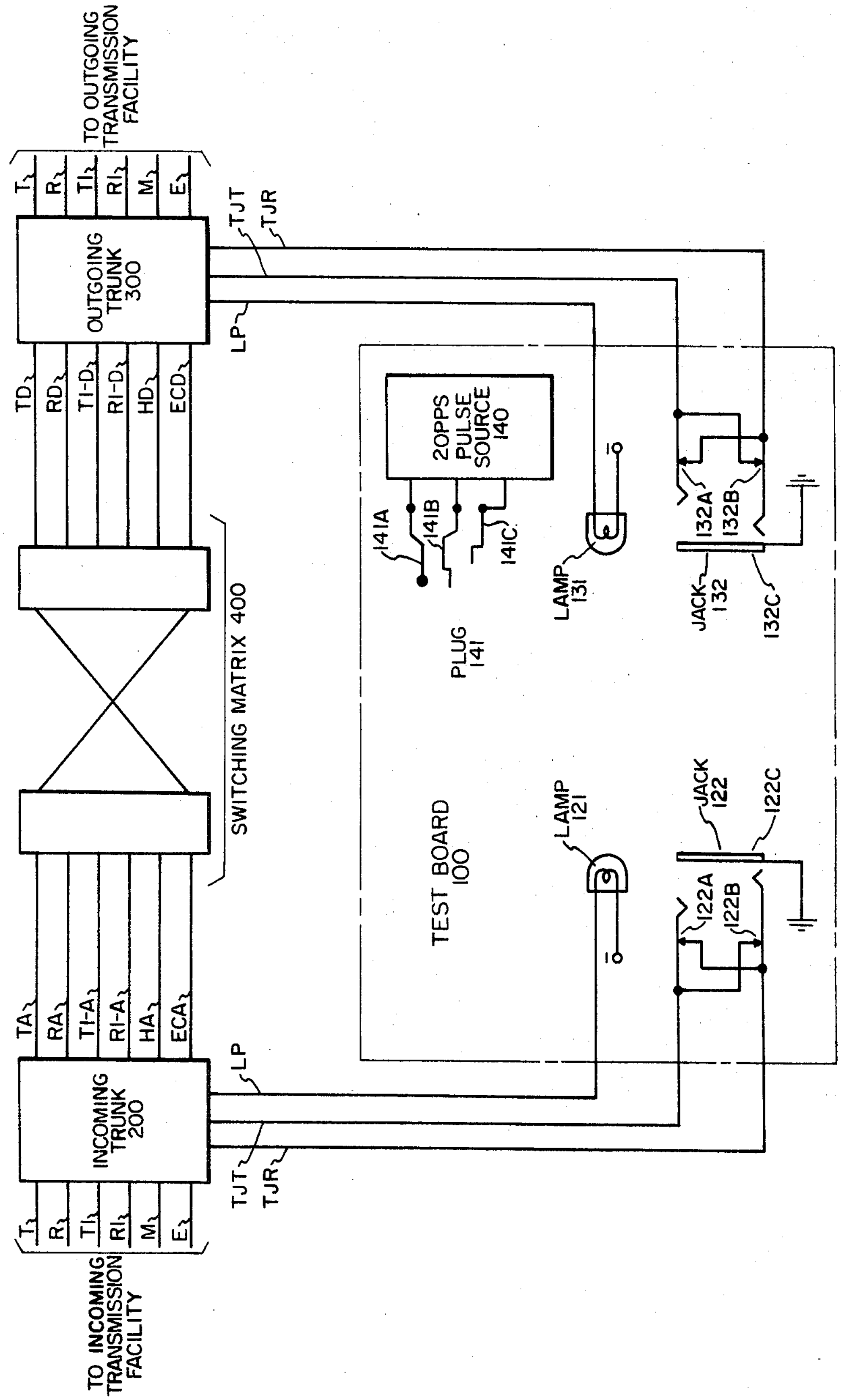
FIG. 1 is a block diagram of a common control telephone switching center including trunks and test facilities in accrdance with the present invention.

Referring now to FIG. 1 a block diagram of a telephone switching center is shown. Included are incoming trunk 200 connected to an external incoming transmission facility, an outgoing trunk 300 connected to an outgoing transmission facility and a switching matrix 400 connecting incoming trunk 200 to outgoing trunk 300.

The means for operating the switching matrix 400 are not shown inasmuch as they do not form a part of the present invention. Inasmuch as the call tracing technique of the present invention is employed after connections between the two trunk circuits have been established the switching functions of the telephone switching center are not involved in the present invention.

Also shown in FIG. 1 is a test board 100 which contains a call trace lamp 121 and jack 122 which are connected to incoming trunk 200 and call trace lamp 131 and call trace jack 132 which are connected to outgoing trunk 300. Also included at the test board is a pulse source 140 which is capable of producing ground pulses at a rate of twenty pulses per second with an approximately 40 percent make, to 60 percent break ratio. This pulse source is connected by means of a cord circuit to plug 141 which may be inserted in either jack 122 or jack 132.

As will be obvious most switching centers have substantially more trunk circuits than those shown in FIG. 1. Therefore it should be noted that the quantity of trunk circuits is in no way a limiting factor in that the only requirement is that each trunk circuit be modified in accordance with the present invention and that an associated lamp and call tracing jack be provided at test board 100 for each trunk circuit located in the switching center.

It should also be noted that while an incoming trunk and an outgoing trunk have been disclosed in FIG. 1, the modifications of the trunk circuits described in the present invention can equally well be applied to the use of two-way trunks. Therefore the identification of an unknown two-way trunk connected to a known two-way trunk, etc. can readily be accomplished by means of the present invention. The detailed description of the preferred embodiment of the present invention however has been limited to the use of a single incoming trunk and a single outgoing trunk solely for purposes of simplicity.

Figure 2:
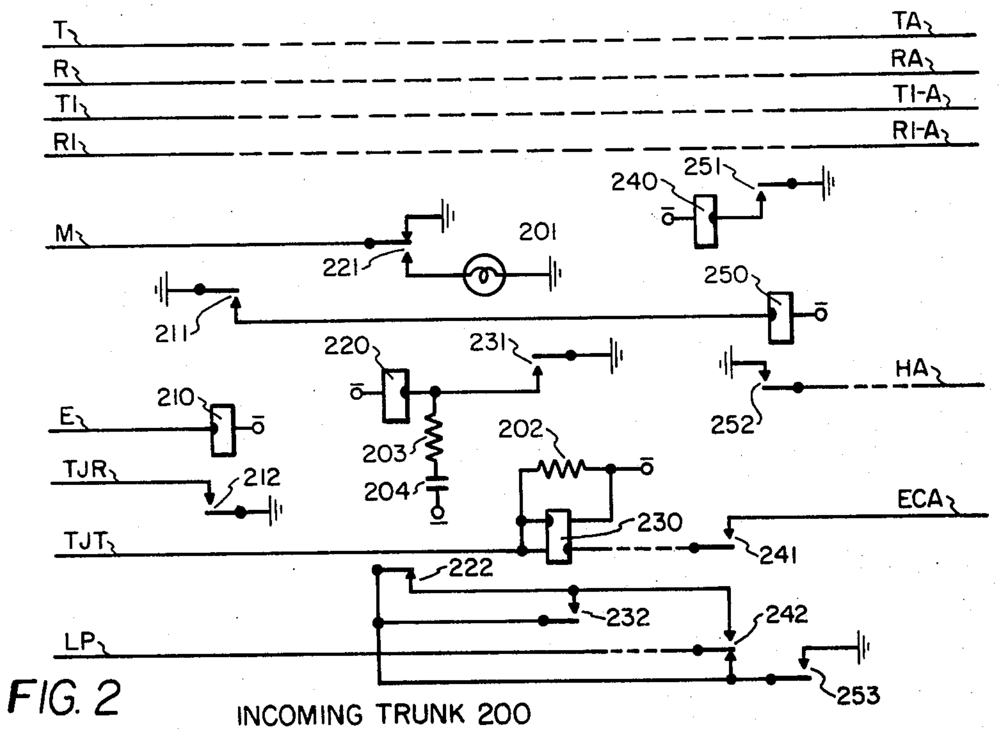
FIG. 2 is a partial schematic diagram of an incoming trunk circuit modified for call tracing in accordance with the present invention.

Incoming trunk 200 is shown in detail in the partial schematic of FIG. 2. The trunk circuit 200 is conventional in nature except for modification for call tracing purposes in accordance with the present invention. Therefore only those portions of the circuit which are involved in the call tracing process have been shown. Other portions of the circuit such as the transmission path have been shown only as dotted lines through the circuit. Likewise certain circuit paths in which some of the modified circuitry is involved also may include paths through other circuitry (not shown) which does not form a part of the present invention, therefore these paths are also shown as dotted lines.

Figure 3:
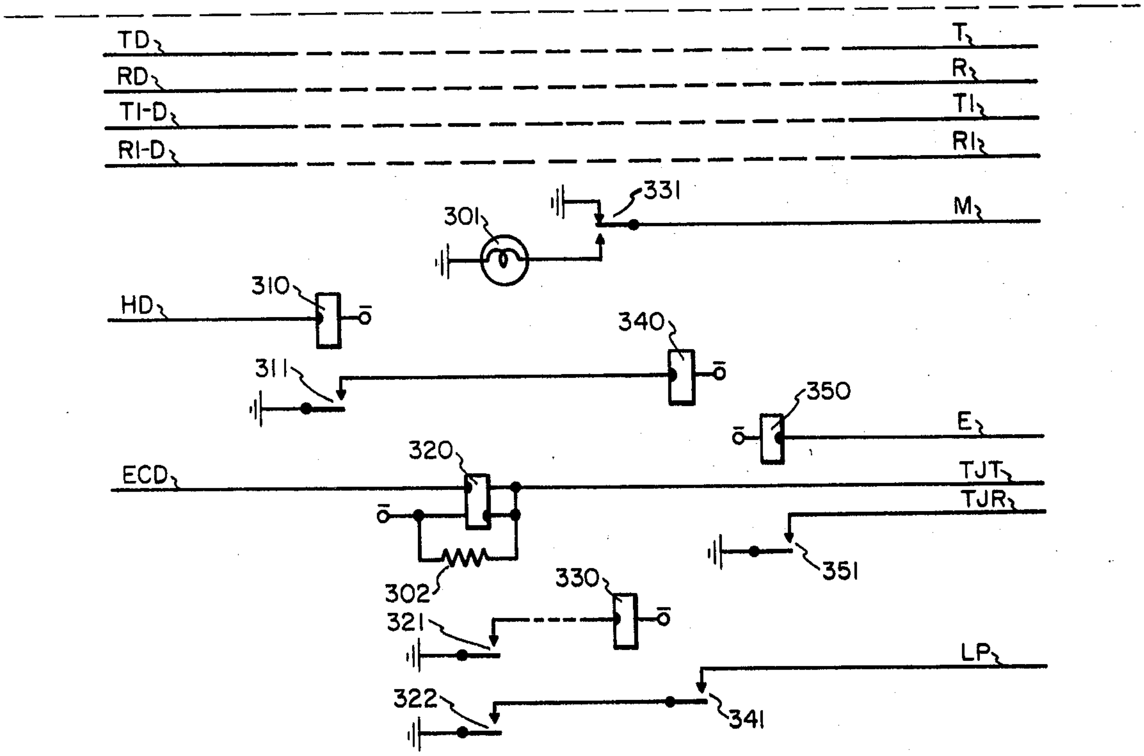
FIG. 3 is a partial schematic diagram of an outgoing trunk circuit modified for call tracing in accordance with the present invention.

FIG. 3 is a partial schematic of an outgoing trunk that includes call tracing facilities in accordance with the present invention. For reasons indicated above in connection with the discussion of the incoming trunk 200, only those portions of the trunk circuit directly involved in the call tracing process have been shown, the rest of the trunk circuit being conventional in nature. Likewise those portions of the circuit that may involve other components not forming a portion of the invention have been shown by dotted lines.

Since it is assumed that incoming trunk circuit 200 has been connected through the switching matrix 400 to outgoing trunk 300, the relays shown in each of the trunks will be considered as already operated.

In the incoming trunk circuit relay 210 is operated from ground extended by seizure of a calling office over the intervening incoming transmission facility. Relay 250 is operated from ground extended at contacts 211. Relay 230 is operated by ground extended at contacts 212 over lead TJR and through the normally closed contacts 122A and 122B of call trace jack 122 associated with incoming trunk 200 at test board 100, via lead TJT to relay 230's upper winding. Relay 220 is operated from ground extended at contacts 231 and relay 240 is operated from ground at contacts 251.

In the outgoing trunk 300 relay 350 is operated from gound returned from the called office connected to the outgoing trunk via the outgoing transmission facility. Relay 310 is operated via ground extended from incoming trunk 200 over lead HD. Relay 340 is operated via ground extended at contacts 311, relay 320 is operated from ground extended at contacts 351 and lead TJR through jack 132 and via lead TJT to the lower winding of relay 320. Relay 330 is operated by extension of ground at contacts 321. As indicated above, before call tracing begins all the relays shown in FIGS. 2 and 3 are in their operated condition over paths outlined above.

Assume now that a call tracing operation is to be initiated at test board 100 and that the identification of incoming trunk 200 is known, but the identity of the outgoing trunk connected through switching matrix 400 is unknown, the following procedure will be followed.

At the test board 100, plug 141 connected to the 20 PPS pulse source 140 will be inserted into the call trace jack 122 associated with known incoming trunk 200. This operation will at contacts 122A and 122B break the bridged connection between leads TJT and TJR and place ground pulses at a twenty pulse per second rate on lead TJT via the tip conductor 141A of plug 141, connected to the pulse source 140. When this happens instead of the constant ground that was extended through contacts 212 and lead TJR being coupled to lead TJT, the ground pulses are applied on lead TJT and applied to the upper and lower windings of relay 230. Each time ground is absent during the pulse train received from pulse source 140, the upper and lower windings of relay 230 will be in series with battery extending through the upper winding and from the upper winding to the lower winding and then through operated contact 241 to lead ECA, through the switching matrix to lead ECD and the upper winding of relay 320 of the unknown trunk circuit. Because ground is present on lead TJT extending to the upper winding of relay 320 of the unknown outgoing trunk, both upper and lower windings of relay 230 (in series) will retain relay 230 in its operated condition, therefore relay 230 at the incoming trunk circuit will not follow the pulses from the pulse generator. However since battery through the windings of relay 230 is periodically extended via lead ECD to the upper winding of relay 320 and from there to ground via lead TJT the lower winding which is also operated from ground over lead TJT and to battery is in opposition to the upper winding and relay 320 will fall. In this manner each time the pulse train provides no ground signal, relay 320 will fall and at contacts 322 ground will be removed from lead LP even though relay 340 remains operated. Thus lamp 131 which is connected to the LP lead will flash at the same rate as pulse source 140 indicating by its flashing that it is associated with outgoing trunk 300 which heretofore has been unidentified. In this manner the outgoing trunk associated with incoming trunk 200 at which the call trace procedure was initiated has been determined.

The following procedure will be followed when the outgoing trunk identity is known, but the connected incoming trunk is unknown. In a manner similar to that described previously plug 141 associated with pulse source 140, is inserted into jack 132 associated with known outgoing trunk 300. In a manner similar to that described previously ground will be removed from lead TJT and the train of ground pulses applied periodically to that lead. At this point the fluctuating ground is applied to the lower winding of relay 320 and to the upper winding. As may be deduced from the previous description during each ground pulse relay 320 is operated by means of its lower winding and the connection of battery thereto. However with each removal of ground relay 320 will remain operated by virtue of ground extended through contacts 212 and over the TJR lead associated with call trace jack 122 and lead TJT through the lower winding of relay 230 and operated contact 241 and lead ECA. That is to say both windings, upper and lower windings of relay 320 are in series and relay 320 will remain operated whether ground pulses are present or not on lead TJT. However in the unknown incoming trunk the presence of battery on lead ECA between ground pulses will place the lower winding of relay 230 in opposition to the upper winding and cause relay 230 to fall. Thus relay 230 will fall each time ground is absent on lead ECA and at contacts 232 ground will be removed from the LP lead extending to lamp 121 at test board 100.

Thus lamp 121 which is connected to the LP lead extending from incoming trunk 200 will flash at the same rate as pulse source 140 indicating by its flashing that it is associ-ated with incoming trunk 200 which heretofore has been unidenti-fied. In this manner the incoming trunk associated with outgoing trunk 300 at which the call trace procedure was initiated has been determined.

As noted previously modification of two-way trunk circuits for identification during a call trace procedure or for initiating call trace procedures is well within the spirit and scope of the present invention, as may be other modifications of the present technique disclosed. Accordingly the present invention is limited only by the scope of the following claims appended hereto.

What is claimed is:

1. A telephone switching center including a plurality of trunks, a switching matrix operated to selectively establish circuit connections between selected trunks, a testing facility, and means for identifying a trunk of unknown identity connected through said matrix to a trunk of known identity, said identification means comprising: detection means included in each of said trunks each comprised of a differentially wound relay; a plurality of individual access means included in said test facility, each associated with a different one of said trunks and each including a circuit con-nection to said detection means in said associated trunk; a plurality of individual signaling means included in said test facility each associated with a different one of said trunks and each including a circuit connection to said detection means in said associated trunk; said plurality of trunks including a trunk of known identity connected through said switching matrix to a trunk of unknown identity; said connection including a circuit connection between said de-tection means included in said known identity trunk and said de-tection means included in said unknown identity trunk; operating means included in said test facility selectively con-nected to said access means associated with said trunk of known identity; said detection means included in said trunk of known identity operated continuously and said connected de-tection means in said unknown identity trunk operated periodically in response to said connected operating means, said signaling means associated with said unknown identity trunk periodically operated in response to said periodic operation of said detect-tion means included in said trunk of unknown identity, to identify said unknown trunk.

2. A telephone switching center as claimed in claim 1 wherein; each of said access means each comprises a jack connected to said associated trunk.

3. A telephone switching center as claimed in claim 1 wherein: each of said signaling means each comprises a lamp connected to said associated trunk.

4. A telephone switching center as claimed in claim 1 wherein: each of said operating means each comprises a source of pulsating potential.

5. A telephone switching center as claimed in claim 1 wherein: each of said differen-tially wound relays includes a first winding connected between said associated access means and said switch-ing matrix, a second winding polarized opposite said first wind-ing, connected between said access means and a source of operat-ing potential, and a pair of switching contacts connected to said associated signaling means.

* * * * *

UNITED STATES PATENT OFFICE
CERTIFICATE OF CORRECTION

Patent No. 3,761,635 Dated Sept. 25, 1973

Inventor(s) J. C. GIBSON, S. H. FUCHS, R. B. VANIMAN

It is certified that error appears in the above-identified patent and that said Letters Patent are hereby corrected as shown below:

Column 6, line 14, omit "each" (second occurrence)
line 17 omit "each" (second occurrence)
line 20 omit "each" (second occurrence)

Signed and sealed this 25th day of December 1973.

(SEAL)
Attest:

EDWARD M.FLETCHER,JR.
Attesting Officer

RENE D. TEGTMEYER
Acting Commissioner of Patents